United States Patent
Roth-Stielow et al.

(10) Patent No.: US 6,229,232 B1
(45) Date of Patent: May 8, 2001

(54) ELECTRIC MOTOR WITH AN UPSTREAM FREQUENCY CONVERTER

(75) Inventors: Jörg Roth-Stielow, Bretten; Josef Schmidt, Graben-Neudorf, both of (DE)

(73) Assignee: Sew-Eurodrive GmbH & Co., Bruschal (DE)

( * ) Notice: Subject to any disclaimer, the term of this patent is extended or adjusted under 35 U.S.C. 154(b) by 0 days.

(21) Appl. No.: 09/355,615

(22) PCT Filed: Jan. 28, 1998

(86) PCT No.: PCT/EP98/00445

§ 371 Date: Jul. 30, 1999

§ 102(e) Date: Jul. 30, 1999

(87) PCT Pub. No.: WO98/35424

PCT Pub. Date: Aug. 13, 1998

(30) Foreign Application Priority Data

Feb. 5, 1997  (DE) ............................................. 197 04 226

(51) Int. Cl.[7] ................................................... H02K 9/00
(52) U.S. Cl. ................. 310/52; 310/64; 310/160
(58) Field of Search .................. 310/52, 64, 89, 310/68 D, 71, 88, 160; 29/596

(56) References Cited

U.S. PATENT DOCUMENTS

| | | | |
|---|---|---|---|
| 3,909,678 | * 9/1975 | Rifkin et al. ........................ | 361/699 |
| 4,451,750 | * 5/1984 | Heuer et al. ........................ | 310/88 |
| 4,727,274 | * 2/1988 | Adam et al. ........................ | 310/239 |
| 4,908,757 | * 3/1990 | Jensen et al. ....................... | 363/141 |
| 4,963,778 | * 10/1990 | Jensen et al. ....................... | 310/68 D |
| 5,095,612 | * 3/1992 | McAvena ............................. | 29/596 |
| 5,158,136 | * 10/1992 | Azar .................................... | 165/185 |
| 5,202,596 | * 4/1993 | Jensen et al. ....................... | 310/64 |
| 5,331,239 | * 7/1994 | Kwun et al. ........................ | 310/68 R |
| 5,369,301 | * 11/1994 | Hayashi et al. ..................... | 257/722 |
| 5,623,191 | * 4/1997 | Wieloch .............................. | 318/801 |
| 5,674,056 | * 10/1997 | Yamamoto et al. ................ | 417/366 |
| 5,714,816 | * 2/1998 | Jensen et al. ....................... | 310/89 |
| 5,814,909 | * 9/1998 | Yamada et al. ..................... | 310/64 |

FOREIGN PATENT DOCUMENTS

| | | | |
|---|---|---|---|
| 3203512 A1 | * | 1/1982 | (DE) . |
| 3602606 | * | 7/1987 | (DE) . |
| 94 15 835 | * | 1/1995 | (DE) . |
| 0 456 169 A1 | * | 5/1991 | (EP) . |

* cited by examiner

Primary Examiner—Joseph Waks
(74) Attorney, Agent, or Firm—Antonelli, Terry, Stout & Kraus LLP

(57) ABSTRACT

An electric motor with a frequency converter for speed control purposes and in which a frequency converter casing is provided with a cooler, is characterized by an intermediate part, replacing a terminal box and receiving the connecting elements. The intermediate part allows the frequency converter casing to be fitted in a thermally decoupled manner with respect to the electric motor.

43 Claims, 4 Drawing Sheets

ELECTRIC MOTOR WITH AN UPSTREAM FREQUENCY CONVERTER

BACKGROUND OF THE INVENTION

The invention relates to an electric motor with a frequency converter for speed control, a casing of the frequency converter being provided with a cooler or dissipator.

The term converter is understood to mean a transformer, which transforms the mains voltage with constant frequency and voltage into a three-phase voltage system with a variable frequency and variable voltage. This three-phase voltage system is supplied to the three-phase motor (asynchronous machine) to be driven, so as in this way to predetermine the electric motor speed by a corresponding choice of the output frequency of the converter.

Unlike in the conventional arrangement, in which the converter is arranged as a separate unit in a switch cabinet and supplies the electric motor by means of a motor lead with a length of up to 100 m, electric motors are already known in which the electric motor-controlling signal and power electronics is integrated as a mechanical unit into the electric motor. This economizes on the previously necessary switch cabinet space requirement and also reduces EMC problems, which were caused in the conventional arrangement by radiation as a result of the long motor leads with a length of up to 100 m. For integrating the frequency converter into the electric motor the electronics thereof are installed in one of the terminal boxes of the electric motor. The connecting elements such as terminals and/or plugs for the supply and signal lines are also located within the terminal box. Particularly with regards to the manufacturing technology and the associated manufacturing costs, such an arrangement in which the frequency converter and electric motor are constructionally interconnected offers numerous advantages. However, problems arise with the cooling of the frequency converter, because in particular the power output stage of the power electronics produces high waste heat levels. In order to dissipate the frequency converter waste heat, on the B side of the electric motor (the B side is the side remote from the driven motor shaft end) a separate fan cowl with fan must be fitted, said fan being driven by the electric motor or by an additional, separate fan motor.

In place of integrating the frequency converter into the terminal box, the frequency converter casing can also be fitted to the electric motor on the B side. Here again for dissipating the frequency converter waste heat a fan must be fitted to the electric motor on the B side and is here again driven by the electric motor or by a separate fan motor. In this variant only the connecting elements such as terminals and/or plugs for the supply and signal lines are housed in one or more terminal boxes, so that they maintain their standard size. However, through the incorporation of the electronics on the B side end of the electric motor, the overall length of the electric motor is now increased. A further increase in the overall length results from the necessary special fan cowl. If no fan is provided, the electronics must be designed for high temperatures and special high temperature resistant, electronic components are used.

As a result of the described special parts when integrating the converter into the electric motor, it is not possible to use a simple standard motor. For the fitting of the frequency converter and special fan cowl and optionally fan motor special structures are required on the electric motor. Apart from the space requirement caused by the additional fan, additional disturbing fan noise arises and the energy costs for the fan as an active cooling element is extremely high. The separate motor required for the fan is also an expensive component.

SUMMARY OF THE INVENTION

Therefore, the problem of the present invention, based on an electric motor in which the frequency converter forms a constructional unit with the motor, is to provide an electric motor, which is simple and inexpensive to manufacture and in which the frequency converter can be integrated into the electric motor without requiring expensive special parts.

According to the invention, the set problem is solved by an electric motor of the aforementioned type, which is characterized by an intermediate part replacing a terminal box and receiving the connecting elements and by means of which the frequency converter casing is fitted in thermally decoupled manner with respect to the electric motor.

Conventional electric motors are provided with a terminal box or connectors for the same. In the electric motor according to the invention with integrated frequency converter the latter is connected by means of an intermediate part replacing the terminal box and as a result the frequency converter casing and the intermediate part casing are separate from one another. Thus, such a frequency converter can be fitted by means of the intermediate part to a conventional electric motor, because there is now no need for additional components, such as fans and a separate fan motor. The cooling and therefore dissipation of the waste heat now takes place by means of a cooler or dissipator provided on the frequency converter casing. Thus, there is no longer a need to adapt the entire motor component for cooling the frequency converter and in particular for dissipating the waste heat of the power output stage by means of special structures and instead corresponding measures need only be taken on the frequency converter casing, e.g. the adaptation of the effective cooling surface of the cooler to the power electronics.

Conventional B side attachments such as motors, e.g. fans, pick-ups, brakes and/or combinations thereof can consequently be fitted without restriction. As a result of the design according to the invention, there is no need for the frequency converter to have an additional fan or a special construction of the fan or fan cowl. The connecting elements such as terminals and/or plugs for supply and signal lines are now housed in the intermediate part and can easily be reached following the disassembly of the frequency converter casing. In order not to unnecessarily increase the construction space requirement for the electric motor with integrated frequency converter, according to a further development the frequency converter casing projects over the intermediate part in the longitudinal direction and the cooler can be positioned below the casing laterally of the intermediate part. Preferably the signal electronics of the frequency converter are positioned above the intermediate part and the power electronics above the cooler in the casing. Thus, the waste heat from the power electronics, particularly its power output stage, can be directly transferred to the cooler by heat conduction. Due to the resulting temperature conditions in the casing of the frequency converter, in the vicinity of the signal electronics which are extremely sensitive, it can be kept very cool. In the prior art electric motors with integrated frequency converter all parts are at the same heat level, because they are thermally well coupled by screwing down and using aluminium alloys for the frequency converter casing. In order to bring about a good thermal coupling of the cooler with the frequency converter power output stage and consequently dissipate the waste heat of the power output stage, the cooler is preferably made from a high thermal conductivity material. Correspondingly the power semiconductors of the power output stage can be made very high without damaging the signal electronics. The volume and effective cooling surface of the cooler can be very compact. According to a further development, the frequency converter casing is also made from a high thermal conductivity material. Thus, the dissipation of the waste heat of the integrated frequency converter firstly takes place via the frequency converter casing surface and secondly via the cooler and thirdly by means of natural convection and radiation. Thus, the frequency converter waste heat which cannot be dissipated by means of the cooler, can be efficiently emitted to the ambient air via the frequency converter casing.

To increase its surface area, the cooler can then be formed by a plurality of cooling ribs or cooling rods.

In order to be able to provide the electric motor rapidly and easily with the frequency converter adapted to the particular use conditions, it is appropriate to provide a detachable connection between the frequency converter and the electric motor, so that an easy line connection is possible of the units to be associated, e.g. by a plug connection, without special knowledge being needed for this purpose. It is merely necessary to disassemble the frequency converter by releasing the connection to the motor or assemble it with the motor.

According to a further development noise suppression devices are fitted in the intermediate part, so that no additional, external devices are required for this purpose.

According to a preferred development the thermal decoupling between the frequency converter and the electric motor is brought about in that between the frequency converter casing and the cooler and/or the intermediate part there is at least one thermal or heat barrier. A heat barrier between the casing and the cooler on the one hand reduces the direct heat transfer from the cooler to the frequency converter casing and on the other also the indirect heat transfer by reducing air circulation in the interior between the cooler and the frequency converter casing. If the heat barrier is provided between the frequency converter casing and the intermediate part, it on the one hand reduces the direct heat transfer from the stator of the motor via the intermediate part to the frequency converter casing and on the other also the indirect heat transfer by reducing air circulation in the interior between the intermediate part and the frequency converter casing. According to a preferred development, separate heat barriers are located between the frequency converter casing and the cooler on the one hand and the intermediate part on the other. Correspondingly the heat barriers can then be made from a different, low thermal conductivity material. It is also advantageous for the heat barriers to surface-cover the complete engagement area between the frequency converter casing and the intermediate part or cooler.

According to a preferred development, between the frequency converter casing and the cooler and/or the intermediate part is provided at least one moisture barrier. As a result the exchange of moisture between the intermediate part and the frequency converter, as well as between the frequency converter and the cooler is reduced. Preferably the heat barriers and moisture barriers form a functional unit. Correspondingly through the heat barriers it is possible to reliably reduce the exchange of moisture between one side of the heat barrier and the other side in the entire extension area.

In place of separate heat barriers or in addition to the heat barriers, it is possible to make the intermediate part from a low thermal conductivity material. In this way the function of the heat barrier is taken over by the intermediate part or the heat transfer is further reduced. It is also possible to construct the frequency converter casing as a moisture barrier, which reduces moisture exchange between the intermediate part and the frequency converter.

In order to seal the frequency converter casing to the outside, so that use is largely independent of local circumstances, such as e.g. a dust-containing atmosphere, etc., the heat and/or moisture barriers surround in a preferably sealing manner the frequency converter casing. As a result of this multifunctional definition, in a particularly inexpensive manner a high protection level can be achieved with respect to liquids and/or dust penetrating from the outside.

A particularly inexpensively and easily disassemblable or assemblable structure can be achieved if the frequency converter casing is constructed as a cover part, which can be placed on the intermediate part as a lower part so as to close the same. This permits an easy replacement of the frequency converter and the intermediate part can also be used as a terminal box after removal and fitting of another lid.

BRIEF DESCRIPTION OF THE DRAWINGS

Other advantages and features of the invention can be gathered from the claims and following description explaining in detail embodiments of the invention with reference to the attached drawings, wherein show:

DETAILED DESCRIPTION OF THE PREFERRED EMBODIMENTS

Figure 1:
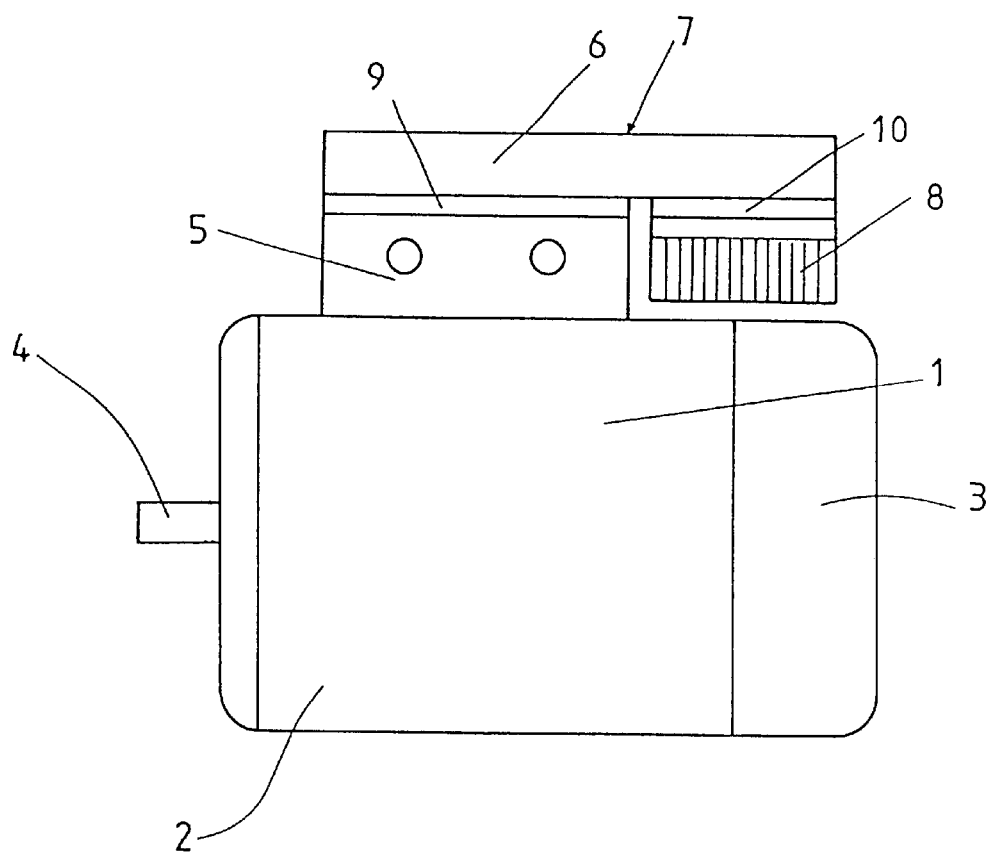
FIG. 1 A side view of an electric motor according to the invention with an integrated frequency converter in a first embodiment.

FIG. 1 shows a first embodiment of a closed, surface-cooled electric motor 1, which is provided in its interior in known manner with a stator and a rotor. On the outside the casing 2 has several surface-enlarging cooling ribs, in order to bring about an improved heat emission. On the B side within the fan cowl 3 is located a fan for ventilating the electric motor. The driven motor shaft end 4 is located on the A side.

Between the A side and the B side of the electric motor 1 on the outside of the casing 2 is provided an intermediate part, which there replaces the otherwise present terminal boxes and consequently has connecting elements such as terminals and/or plugs for supply and signal lines. The intermediate part 5 can be made from a low thermal conductivity material. On the side of the intermediate part 5 fitted to the stator of the electric motor 1 remote from the casing 2 of said electric motor is provided a casing 6 of a frequency converter 7, which in the form of a cover part is mounted on the top of the intermediate part 5 so as to close the latter. The casing 6 projects laterally over the intermediate 5 in the direction of the B side end of the electric motor 1 and has on its free underside a cooler or dissipator 8, which is formed in the represented embodiment by cooling ribs. Between the intermediate part 5 and the casing 6 of the frequency converter 7 is provided a flat heat barrier 9, so as to seal against one another the casing 6 and intermediate part 5. Between the casing 6 and cooler 8 is provided a further, separate heat barrier 10. However, these heat barriers 9 and 10 can be simultaneously also constructed as moisture barriers 17 (see FIG. 4). It is also possible to provide additional moisture barriers. The two heat barriers 9 and 10 are preferably made from a low thermal conductivity material and are flat or laminar.

Figure 2:
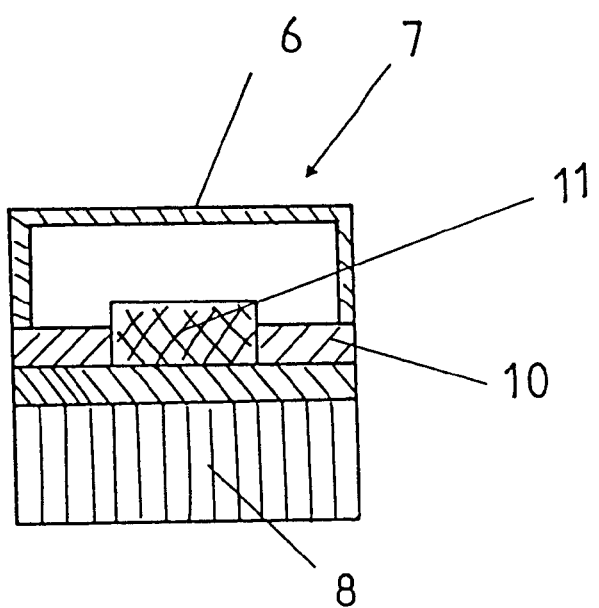
FIG. 2 A cross-section through the frequency converter of FIG. 1.

As can be gathered from FIG. 2, above the cooling body 8 the power output stage 11 of the power electronics of the frequency converter 7 is located within the heat barrier 10. The signal electronics 16 of the frequency converter 7 is correspondingly located above the intermediate part 5 (see FIG. 4).

Figure 3:
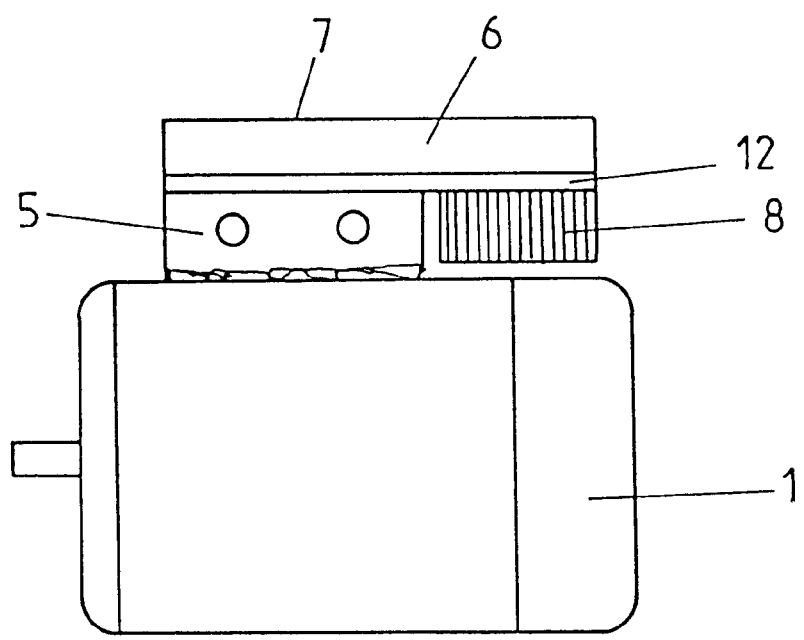
FIG. 3 An electric motor according to the invention with integrated frequency converter in a second embodiment.

In the embodiment shown in FIG. 3 the same components are given the same reference numerals. Unlike in the previous embodiment, the heat barrier 12 is constructed in one piece in FIG. 3 between the casing 6 and the intermediate part 5, as well as the cooling body 8. As a result a particularly inexpensive structure can be obtained.

Figure 4:
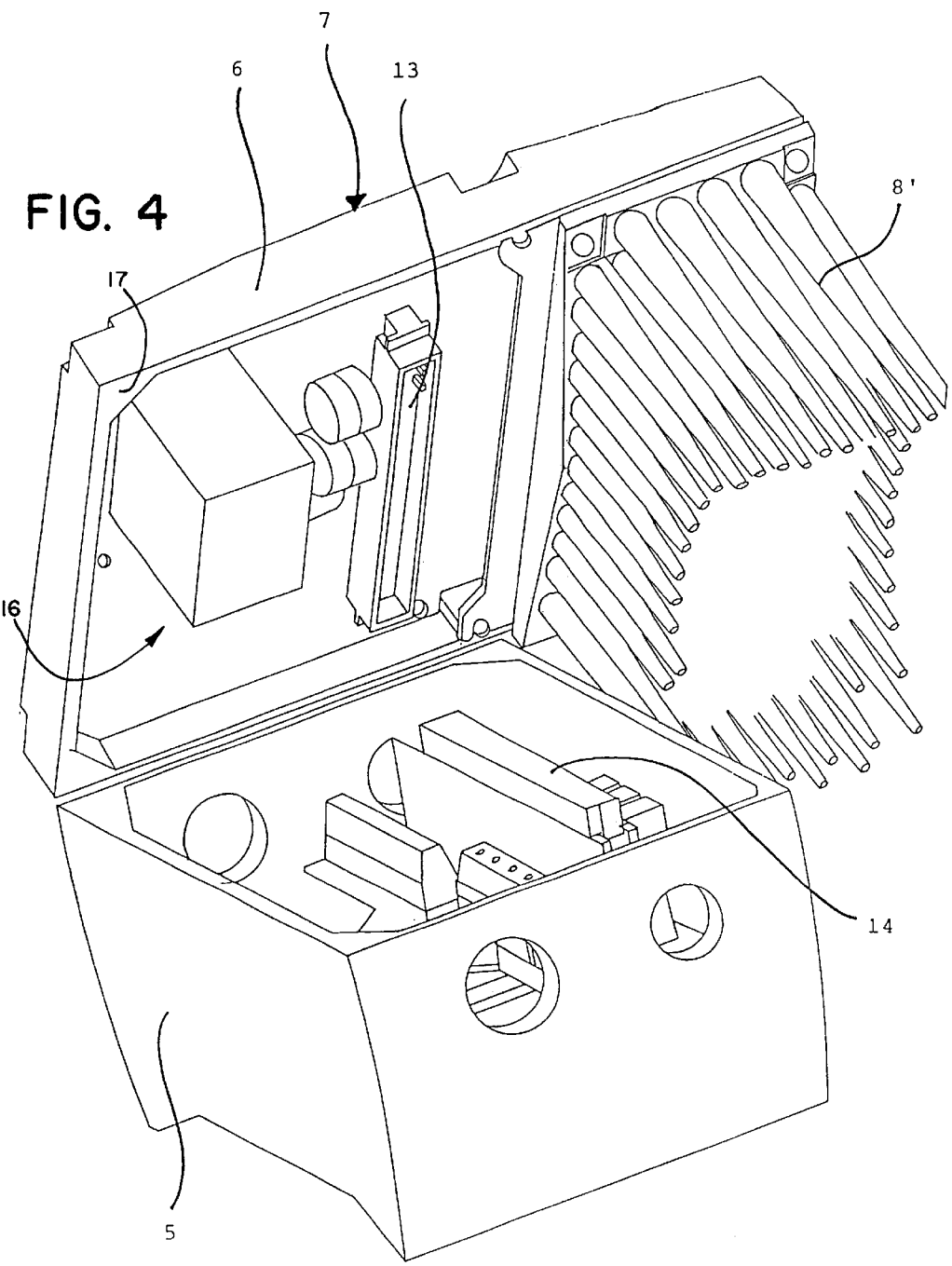
FIG. 4 A perspective view of a frequency converter, released from the intermediate part, together with the latter.

In the embodiment shown in FIG. 4 the casing 6 of the frequency converter is constructed as a cover part for sealing the intermediate part 5 and is shown disassembled from the intermediate part 5. In this embodiment to increase the surface area of the cooling body 8' it is formed by a plurality of cooling rods.

To create an electrical connection between the frequency converter 7 and intermediate part 5, a plug connector 13, 14 is provided. One part 13 of the plug connector is fixed to the frequency converter 7 and the other part 14 is fixed to the intermediate part 5.

What is claimed is:

1. Electric motor comprising:
   a motor unit provided in a motor casing;
   a frequency converter for speed control provided in a casing;
   a cooler connected to the casing;
   an intermediate part provided between the casing an the motor casing and having connecting elements for electrically connecting the frequency converter to the motor unit; and
   separate first and second heat barriers, the first heat barrier being provided between the casing of the frequency converter and the cooler, and the second heat barrier being provided between the casing and the intermediate part.

2. Electric motor according to claim 1, characterized by the intermediate part being made from a low thermal conductivity material.

3. Electric motor according to claim 2, further comprising at least one moisture barrier located between the casing of the frequency converter and the cooler and/or intermediate part.

4. Electric motor according to claim 1, further comprising at least one moisture barrier located between the casing of the frequency converter and the cooler and/or intermediate part.

5. Electric motor according to claim 1, characterized in that the casing of the frequency converter projects in a longitudinal direction of a shaft of the motor unit over the intermediate part and the cooler is located below the casing laterally of the intermediate part.

6. Electric motor according to claim 5, characterized in that the frequency converter comprises signal electronics provided in the casing and located above the intermediate part, and power electronics provided in the casing above the cooler.

7. Electric motor according to claim 1, characterized in that the cooler is made from a high thermal conductivity material.

8. Electric motor according to claim 7, characterized in that the cooler is formed by a plurality of cooling ribs.

9. Electric motor according to claim 7, characterized in that the cooler is formed by a plurality of cooling rods.

10. Electric motor according to claim 1, characterized in that the casing of the frequency converter is made from a high thermal conductivity material.

11. Electric motor according to claim 1, characterized in that the frequency converter is electrically connectable to the intermediate part by a plug connector.

12. Electric motor according to claim 11, characterized in that plug connector comprises first and second parts, the first part being fixed to the frequency converter and the second part to the intermediate part.

13. Electric motor according to claim 1, characterized by noise suppression device in the intermediate part.

14. Electric motor according to claim 1, characterized by at least one moisture barrier located between the casing of the frequency converter and the cooler and/or the intermediate part.

15. Electric motor according to claim 14, characterized in that the at least one moisture barrier surrounds in a sealing manner the frequency converter casing.

16. Electric motor according to claim 1, characterized in that the casing of the frequency converter is constructed in the form of a cover part, which can be placed on the intermediate part as a base part and seals the intermediate part.

17. Electric motor, comprising:
    a motor unit provided in a motor casing;
    a frequency converter for speed control provided in a casing;
    a cooler connected to the casing;
    an intermediate part provided between the casing an the motor casing and having connecting elements for electrically connecting the frequency converter to the motor unit; and
    at least one moisture barrier located between the casing of the frequency converter and the cooler and/or intermediate part.

18. Electric motor according to claim 17, characterized by the intermediate part being made from a low thermal conductivity material.

19. Electric motor according to claim 17, characterized in that the casing of the frequency converter projects in a longitudinal direction of a shaft of the motor unit over the intermediate part and the cooler is located below the casing laterally of the intermediate part.

20. Electric motor according to claim 19, characterized in that the frequency converter comprises signal electronics provided in the casing and located above the intermediate part, and power electronics provided in the casing above the cooler.

21. Electric motor according to claim 17, characterized in that the cooler is made from a high thermal conductivity material.

22. Electric motor according to claim 21, characterized in that the cooler is formed by a plurality of cooling ribs.

23. Electric motor according to claim 21, characterized in that the cooler is formed by a plurality of cooling rods.

24. Electric motor according to claim 17, characterized in that the casing of the frequency converter is made from a high thermal conductivity material.

25. Electric motor according to claim 17, characterized in that the frequency converter is electrically connectable to the intermediate part by a plug connector.

26. Electric motor according to claim 25, characterized in that plug connector comprises first and second parts, the first part being fixed to the frequency converter and the second part to the intermediate part.

27. Electric motor according to claim 17, characterized by noise suppression device in the intermediate part.

28. Electric motor according to claim 17, characterized by at least one heat barrier located between the casing of the frequency converter and the cooler and/or the intermediate part.

29. Electric motor according to claim 17, characterized in that the at least one moisture barrier surrounds in a sealing manner the frequency converter casing.

30. Electric motor according to claim 17, characterized in that the casing of the frequency converter is constructed in the form of a cover part, which can be placed on the intermediate part as a base part and seals the intermediate part.

31. Electric motor, comprising:
- a motor unit provided in a motor casing;
- a frequency converter for speed control provided in a casing;
- a cooler connected to the casing; and
- an intermediate part made from low thermal conductivity material provided between the casing an the motor casing and having connecting elements for electrically connecting the frequency converter to the motor unit.

32. Electric motor according to claim 31, characterized in that the casing of the frequency converter projects in a longitudinal direction of a shaft of the motor unit over the intermediate part and the cooler is located below the casing laterally of the intermediate part.

33. Electric motor according to claim 32, characterized in that the frequency converter comprises signal electronics provided in the casing and located above the intermediate part, and power electronics provided in the casing above the cooler.

34. Electric motor according to claim 31, characterized in that the cooler is made from a high thermal conductivity material.

35. Electric motor according to claim 34, characterized in that the cooler is formed by a plurality of cooling ribs.

36. Electric motor according to claim 34, characterized in that the cooler is formed by a plurality of cooling rods.

37. Electric motor according to claim 31, characterized in that the casing of the frequency converter is made from a high thermal conductivity material.

38. Electric motor according to claim 31, characterized in that the frequency converter is electrically connectable to the intermediate part by a plug connector.

39. Electric motor according to claim 38, characterized in that plug connector comprises first and second parts, the first part being fixed to the frequency converter and the second part to the intermediate part.

40. Electric motor according to claim 31, characterized by noise suppression device in the intermediate part.

41. Electric motor according to claim 31, characterized by at least one heat barrier located between the casing of the frequency converter and the cooler and/or the intermediate part.

42. Electric motor according to claim 31, characterized in that at least one heat barrier surrounds in a sealing manner the frequency converter casing.

43. Electric motor according to claim 31, characterized in that the casing of the frequency converter is constructed in the form of a cover part, which can be placed on the intermediate part as a base part and seals the intermediate part.

* * * * *